United States Patent
Yun et al.

(10) Patent No.: US 10,116,479 B2
(45) Date of Patent: Oct. 30, 2018

(54) APPARATUS AND OPERATING METHOD FOR CONTROLLING PEAK TO AVERAGE POWER RATIO OF SIGNAL IN WIRELESS COMMUNICATION SYSTEM

(71) Applicants: Samsung Electronics Co., Ltd, Gyeonggi-do (KR); Industry-Academic Corporation Foundation, Yonsei University, Seoul (KR)

(72) Inventors: Yeohun Yun, Gyeonggi-do (KR); Sooyong Choi, Seoul (KR); Seongbae Han, Seoul (KR); Hyungju Nam, Seoul (KR)

(73) Assignees: Samsung Electronics Co., Ltd., Suwon-si (KR); Industry-Academic Corporation Foundation, Yonsei University, Seoul (KR)

( * ) Notice: Subject to any disclaimer, the term of this patent is extended or adjusted under 35 U.S.C. 154(b) by 12 days.

(21) Appl. No.: 15/348,941

(22) Filed: Nov. 10, 2016

(65) Prior Publication Data

US 2017/0134204 A1    May 11, 2017

(30) Foreign Application Priority Data

Nov. 10, 2015  (KR) ........................ 10-2015-0157458

(51) Int. Cl.
*H04L 27/26*  (2006.01)
*H04L 27/34*  (2006.01)

(52) U.S. Cl.
CPC ........ *H04L 27/2621* (2013.01); *H04L 27/264* (2013.01); *H04L 27/2615* (2013.01);
(Continued)

(58) Field of Classification Search
CPC ................... H04L 27/264; H04L 2025/03414
See application file for complete search history.

(56) References Cited

U.S. PATENT DOCUMENTS

| | | | |
|---|---|---|---|
| 2012/0027070 A1* | 2/2012 | Beidas | .............. H04L 1/0048 375/229 |
| 2012/0189036 A1 | 7/2012 | Bellanger | |

(Continued)

FOREIGN PATENT DOCUMENTS

KR     20150035424     4/2015

OTHER PUBLICATIONS

Tero Ihalainen, et al., "Filter Bank Based Multi-Mode Multiple Access Scheme for Wireless Uplink", 17th European Signal Processing Conference (EUSIPCO 2009), Glasgow, Scotland, Aug. 24-28, 2009, 5 pages.

(Continued)

*Primary Examiner* — Ross Varndell

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Various exemplary embodiments of the present disclosure include: performing Fourier transform with respect to a plurality of modulation signals; dividing the plurality of transformed signals into at least two groups; generating FBMC symbols corresponding to the groups; transmitting the FBMC symbols.

18 Claims, 18 Drawing Sheets

(52) U.S. Cl.
CPC ...... *H04L 27/2628* (2013.01); *H04L 27/2636* (2013.01); *H04L 27/34* (2013.01)

(56) References Cited

U.S. PATENT DOCUMENTS

| | | | |
|---|---|---|---|
| 2014/0321524 A1* | 10/2014 | Kim | H04L 27/2647 375/232 |
| 2015/0092827 A1* | 4/2015 | Traverso | H04L 25/0224 375/224 |
| 2016/0269217 A1 | 9/2016 | Nam et al. | |

OTHER PUBLICATIONS

Chung Him (George) Yuen, et al., "Single Carrier Frequency Division Multiple Access (SC-FDMA) for Filter Bank Multicarrier Communication Systems", http://dx.doi.org/10.4108//CST.CROWNCOM2010.9200, 2010, 5 pages.

Hyungju Nam, et al., "A New Filter-Bank Multicarrier System for QAM Signal Transmission and Reception", IEEE ICC 2014, Wireless Communications Symposium, 6 pages.

Hyung G. Myung, et al., "Single Carrier FDMA for Uplink Wireless Transmission", IEEE Vehicular Technology Magazine, Sep. 2006, 9 pages.

M. Bellanger, et al., "FBMC Physical Layer : A Primer", PHYDYAS, Jun. 2010, 31 pages.

* cited by examiner

APPARATUS AND OPERATING METHOD FOR CONTROLLING PEAK TO AVERAGE POWER RATIO OF SIGNAL IN WIRELESS COMMUNICATION SYSTEM

CROSS-REFERENCE TO RELATED APPLICATION(S) AND CLAIM OF PRIORITY

The present application is related to and claims priority under 35 U.S.C. § 119 to an application filed in the Korean Intellectual Property Office on Nov. 10, 2015 and assigned Serial No. 10-2015-0157458, the contents of which are incorporated herein by reference.

TECHNICAL FIELD

Exemplary embodiments of the present disclosure relate to controlling a Peak to Average Power Ratio (PAPR) of a signal in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An FBMC transmission system includes a filtering process, a multi carrier modulation process using an inverse fast fourier transform (IFFT) block, and a process of overlapping modulated symbol blocks. The FBMC transmission system may be classified by an offset quadrature amplitude modulation (OQAM) method, and a quadrature amplitude modulation (QAM) method.

A discrete fourier transform (DFT) spreading technique has been considered as a technique for reducing the PAPR in an orthogonal frequency division multiplexing (OFDM) transmission system. The OFDM transmission system performs DFT prior to performing IFFT, thereby obtaining a PAPR reduction effect. In the DFT spreading technique, the size of DFT is equal to the number of carriers allocated to a transmitting apparatus. The DFT size may be smaller than or equal to the IFFT size. A signal which is pre-processed by the DFT method is modulated by the IFFT block. The above-described method is classified into a localized frequency division multiple access (LFDMA) and an interleaved frequency division multiple access (IFDMA) according to a method for allocating a carrier location of an IFFT block.

Since the FBMC transmission system overlaps signals to transmit the signals unlike the OFDM transmission system, the PAPR reduction effect is weak when the DFT spreading technique is applied in the same way as in the OFDM transmission system.

SUMMARY

To address the above-discussed deficiencies, it is a primary object to provide a reduction effect of a PAPR which is generated from an overlapping structure by applying a DFT spreading technique of an LFDMA method in an FBMC transmission system.

An exemplary embodiment of the present disclosure may provide an operating method of a transmitting apparatus. The operating method includes: performing Fourier transform with respect to a plurality of modulation signals; dividing the plurality of transformed signals into at least two groups; generating FBMC symbols corresponding to the groups; transmitting the FBMC symbols.

Another exemplary embodiment of the present disclosure may provide an operating method of a receiving apparatus. The operating method includes: dividing a plurality of received signals into at least two groups; generating FBMC symbols corresponding to the at least two divided groups; performing inverse Fourier transform with respect to the signals of the at least two generated groups simultaneously; and generating a plurality of restored signals by performing channel estimation and equalization with respect to the plurality of transformed signals.

Another exemplary embodiment of the present disclosure may provide a transmitting apparatus. The transmitting apparatus includes: a transmitter configured to transmit signals; and a modulator functionally combined with the transmitter, and the modulator is configured to: perform Fourier transform with respect to a plurality of modulation signals; divide the plurality of transformed signals into at least two groups; and generate FBMC symbols corresponding to the groups.

Another exemplary embodiment of the present disclosure may provide a receiving apparatus. The receiving apparatus includes: a receiver configured to receive a plurality of signals; and a demodulator functionally combined with the receiver, and the demodulator is configured to: divide the plurality of received signals into at least two groups; generate FBMC symbols corresponding to the at least two divided groups; perform inverse Fourier transform with respect to the signals of the at least two generated groups simultaneously; and generate a plurality of restored signals by performing channel estimation and equalization with respect to the plurality of transformed signals.

Various exemplary embodiments provide an effective DFT spreading technique which can enhance a PAPR reduction effect in an FBMC transmission system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Exemplary embodiments of the present disclosure will be described herein below with reference to the accompanying drawings. In the following description, well-known functions or constructions are not described in detail since they would obscure the invention in unnecessary detail. Also, the terms used herein are defined according to the functions of various exemplary embodiments. Thus, the terms may vary depending on user's or operator's intension and usage. Therefore, the terms used herein must be understood based on the descriptions made herein.

Hereinafter, technology for an effective DFT spreading technique which can enhance a PAPR reduction effect in a wireless communication system according to the present disclosure will be described.

In the following description, the term indicating modulation, the term indicating demodulation, the term indicating filtering, the term indicating offset, the term indicating signals, and the term indicating an element of an apparatus are merely examples for the convenience of explanation. Therefore, the present disclosure is not limited to the terms described below and other terms having the same technical meaning may be used.

Figure 1:
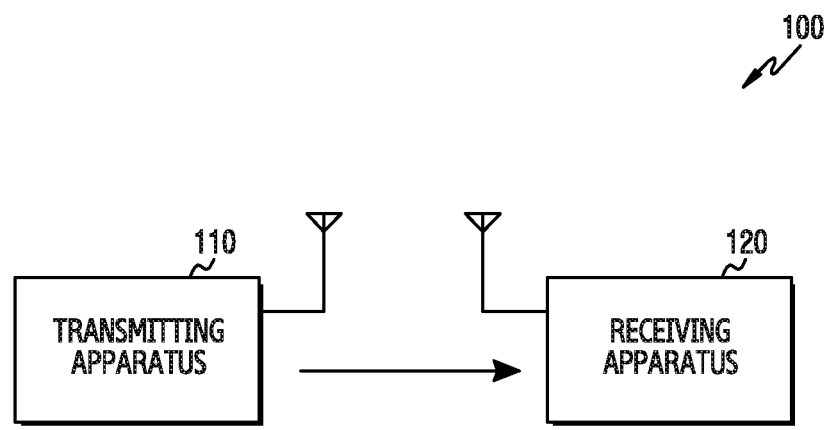
FIG. 1 illustrates an example of a wireless communication system in which signals are transmitted and received.

FIG. 1 illustrates an example of a wireless communication system 100 in which signals are transmitted and received.

Referring to FIG. 1, the system 100 includes a transmitting apparatus 110 and a receiving apparatus 120. The transmitting apparatus 110 and the receiving apparatus 120 may correspond to a user device or a network device. The user device may include a terminal, a mobile station, user equipment, or the like. The network device may include a base station, a node B (nodeB), an evolved node B (enodeB), or the like. For example, both the transmitting apparatus 110 and the receiving apparatus 120 may correspond to terminals. In another example, the transmitting apparatus 110 may correspond to a terminal and the receiving apparatus 120 may correspond to a base station.

The transmitting apparatus 110 may transmit signals to the receiving apparatus 120. For example, the transmitting apparatus 110 may transmit at least one symbol which is modulated in an FBMC method. The receiving apparatus 120 may receive signals. Although the transmitting apparatus 110 is illustrated as being able to transmit signals and the receiving apparatus 120 is illustrated as being able to receive signals for the convenience of explanation, the receiving apparatus 120 may also transmit signals and the transmitting apparatus 110 may also receive signals.

Figure 2:
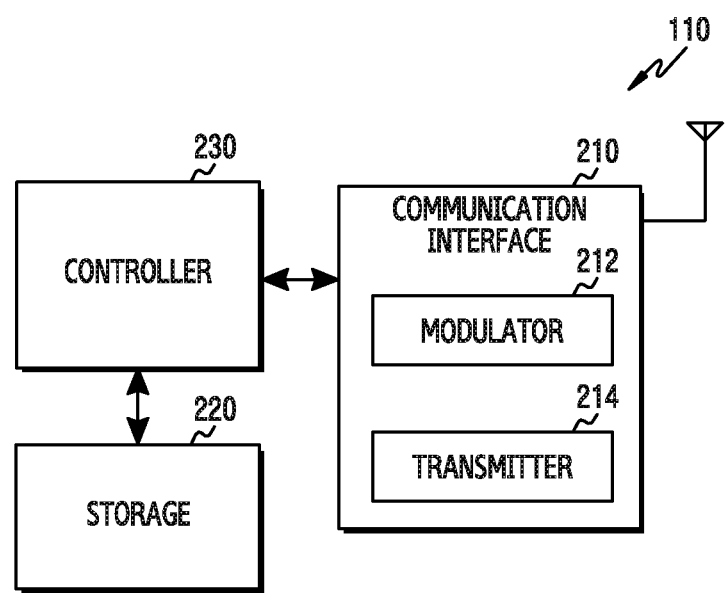
FIG. 2 illustrates a transmitting apparatus according to an exemplary embodiment.

FIG. 2 illustrates a transmitting apparatus 110 according to exemplary embodiments. The term "unit" and the term ending the suffix "-er" or "-or" which are used herein may refer to a unit which processes at least one function or operation, and these terms may refer to hardware, software, or a combination of hardware and software.

Referring to FIG. 2, the transmitting apparatus 110 includes a communication interface 210, a storage 220, and a controller 230. The communication interface 210 may include a modulator 212 and a transmitter 214. The modulator 212 may provide a series of functions for generating transmission signals. For example, the modulator 212 may perform a function of converting between a baseband signal and a bit string according to a physical layer standard of the system. In addition, the modulator 212 may generate complex symbols by encoding and modulating a transmission bit string. The modulator 212 may include a transmission filter bank. The transmission filter bank may obtain a waveform in a desired form by filtering the modulated complex symbols. The filtering operation may be performed in a frequency domain or may be performed in a time domain. For example, the modulated symbols may be filtered in the frequency domain and may be transformed into the time domain by performing Inverse Fast Fourier Transform (IFFT). In another example, the modulated symbols may be transformed into the time domain by performing IFFT and may be filtered.

The transmitter 214 may perform a series of functions for transmitting signals. For example, the transmitter 214 may up-convert a baseband signal into a radio frequency (RF) band signal and then may transmit the signal through an antenna.

The storage 220 may store a basic program for the operation of the transmitting apparatus 110, an application program, and data such as setting information or the like. The storage 220 may include a volatile memory, a non-volatile memory, or a combination of a volatile memory and a non-volatile memory.

The controller 230 may control the overall operations of the transmitting apparatus 110. For example, the controller 230 may transmit and receive signals through the communication interface 210. In addition, the controller 230 may write or read data on or from the storage 220. The controller 230 may include at least one of a processor or a micro processor, or may be a part of the processor. In particular, the controller 230 may control a function of reducing the PAPR of a signal transmitted from the communication interface 210. For example, the controller 230 may control the communication interface 210 to perform operations for reducing the PAPR, which will be described below.

Figure 3:
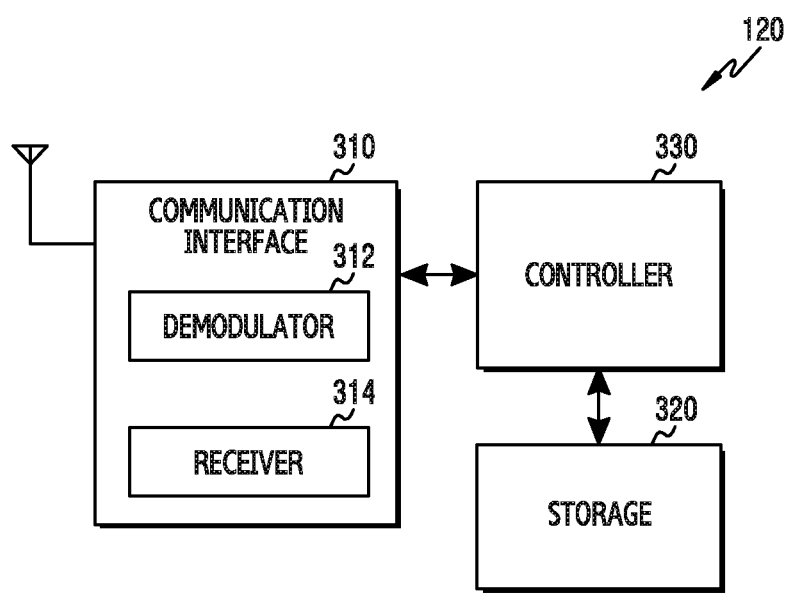
FIG. 3 illustrates a receiving apparatus according to exemplary embodiments.

FIG. 3 illustrates a receiving apparatus 120 according to exemplary embodiments. The term "unit" and the term ending the suffix "-er" or "-or" which are used herein may refer to a unit which processes at least one function or operation, and these terms may refer to hardware, software, or a combination of hardware and software.

Referring to FIG. 3, the receiving apparatus 120 may include a communication interface 310, a storage 320, and a controller 330. The communication interface 310 may include a demodulator 312 and a receiver 314. The receiver 314 may perform a series of functions for receiving signals through an antenna. For example, the receiver 314 down-converts an RF band signal received through the antenna into a baseband signal.

The demodulator 312 may perform a series of functions for restoring received signals. For example, the demodulator 312 performs a function of converting between a baseband signal and a bit string according to a physical layer standard of the system. For example, when receiving data, the demodulator 312 restores a reception bit string by demodulating and decoding the baseband signal. The demodulator 312 may include a reception filter bank. The reception filter bank may obtain a waveform in a desired form by filtering the demodulated symbols. The filtering operation may be performed in a frequency domain or may be performed in a time domain. For example, the demodulated symbols may be filtered in the time domain and may be transformed into the frequency domain by performing Fast Fourier Transform (TFT). In another example, the demodulated symbols may be transformed into the frequency domain by performing FFT and may be filtered.

The storage 320 may store a basic program for the operation of the receiving apparatus 120, an application program, and data such as setting information or the like. The storage 320 may include a volatile memory, a non-volatile memory, or a combination of a volatile memory and a non-volatile memory.

The controller 330 may control the overall operations of the receiving apparatus 120. For example, the controller 330 may receive signals through the communication interface 310. In addition, the controller 330 may write or read data on or from the storage 320. The controller 330 may include at least one of a processor or a micro processor, or may be a part of the processor. In particular, the controller 330 may control a function for reducing the PAPR of a signal received at the communication interface 310. For example, the controller 330 may control the communication interface 310 to perform operations for reducing the PAPR, which will be described below.

Figure 4:
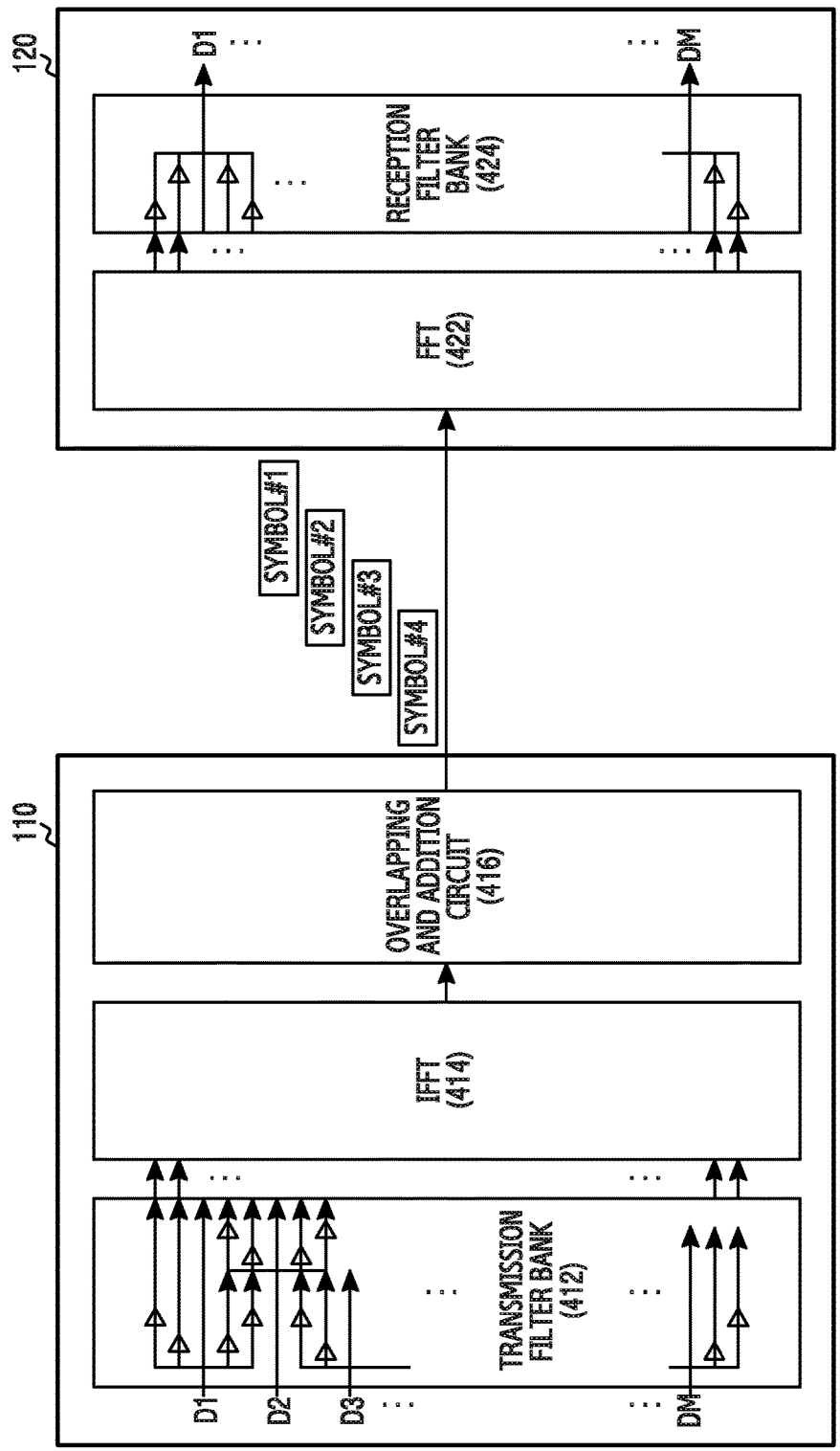
FIG. 4 illustrates an operation of transmitting and receiving signals in a filter bank multi carrier (FBMC) transmission system according to exemplary embodiments.

FIG. 4 illustrates an example of an operation of transmitting and receiving signals in an FBMC transmission system. FIG. 4 illustrates an example of an operation of filtering in a frequency domain.

Referring to FIG. 4, the transmitting apparatus 110 includes a transmission filter bank 412, an IFFT 414, an overlapping and addition circuit 416. The transmission filter bank 412 may correspond to the transmission filter bank 212 of FIG. 2. The transmission filter bank 412 may oversample data symbols D1 to Dm. In an exemplary embodiment, FIG. 4 illustrates that an oversampling factor is 5. When the oversampling is performed, the transmission filter bank 412 may perform filtering using a filter order K. In an exemplary embodiment, FIG. 4 illustrates that the filter order K is 2. That is, the oversampling factor is determined by 5=2K+1. Although the oversampling factor is 5 and the filter order is 2 in FIG. 4 for the convenience of explanation, other values may be determined for the oversampling factor and the filter order. For example, the transmission filter bank 412 may generate the five (5) same D1 by oversampling D1. Similarly, the transmission filter bank 412 may oversample D2 to Dm and multiply each of the oversampled symbols by a filter coefficient. In this case, some of the filtered samples of neighbor data symbols are added. For example, two of the samples of the filtered D1 may be added with two of the samples of the filtered D2. In order for the added samples to be separated in the receiving apparatus 120, different filters may be applied to neighbor data symbols. In addition, in order for the added samples to be separated in the receiving apparatus 120, the neighbor data symbols may be divided into at least two different groups. For example, in the case of the OQAM method, the neighbor data symbols may be divided into a real value and an imaginary value.

The IFFT 414 may perform an IFFT operation with respect to the data symbols outputted from the transmission filter bank 412. That is, the IFFT 414 may generate FBMC symbols using the IFFT operation. The length of the FBMC symbols is longer than the number M of existing data symbols because of the oversampling performed in the transmission filter bank 412. Accordingly, the overlapping and addition circuit 416 may partially overlap and add the FBMC symbols generated by the IFFT 414. The FBMC symbols may not be transmitted independently from one another in the time domain, and may be transmitted, partially overlapping one another. More specifically, the rear end of the first FBMC symbol and the front end of the second FBMC symbol may overlap each other. That is, the overlapping and addition circuit 416 may arrange the FBMC symbols at predetermined intervals, and generate a transmission signal by adding the samples of the FBMC symbols located in the same time zone.

Although not shown in FIG. 4, the transmitting apparatus 110 may further include at least one circuit to transmit the transmission signal generated by the overlapping and addition circuit 416. The transmission signal generated by the overlapping and addition circuit 416 is a digital baseband signal. Accordingly, the transmission apparatus 110 may further include at least one circuit to convert the transmission signal into an analogue signal and up-convert the analogue signal into a signal of an RF band.

The transmission signal may be transmitted to the antenna of the receiving apparatus 120. An FFT 422 may perform an FFT operation with respect to the reception signal. The FFT 422 may extract as many samples as the length of a single FBMC symbol from the reception signal which has been generated by overlapping and adding the FBMC symbols, and may perform the FFT operation. A reception filter bank 424 may filter the samples corresponding to the single FBMC symbol, which are provided from the FFT 422, and may perform downsampling. The samples may be restored to D1 to Dm by the downsampling. For example, the reception filter bank 424 may multiply five (5) samples of the samples of the reception signal which has undergone the FFT operation by filter coefficients, and may add the samples.

Figure 5:
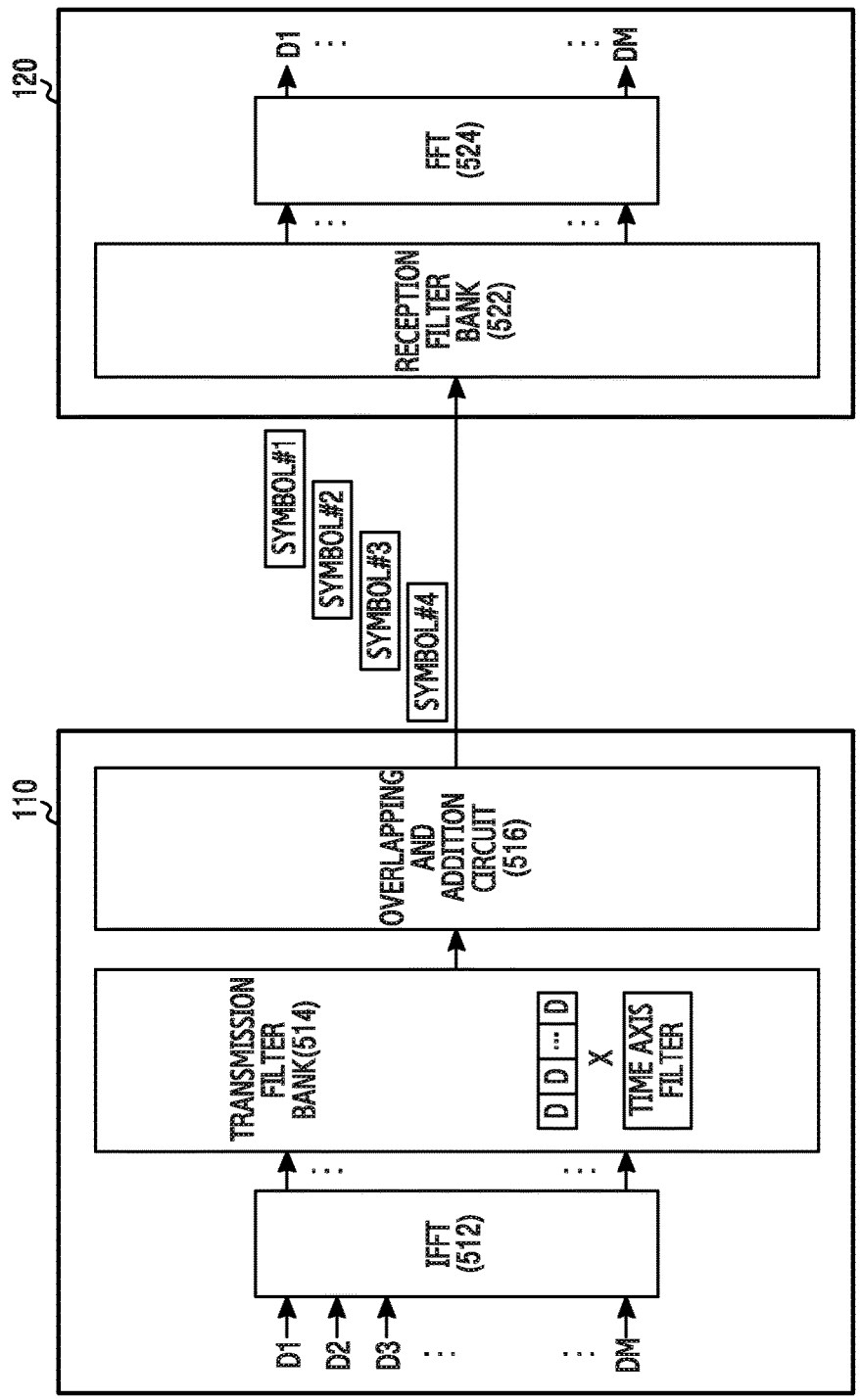
FIG. 5 illustrates another example of the operation of transmitting and receiving signals in an FBMC transmission system according to exemplary embodiments.

FIG. 5 illustrates another example of the operation of transmitting and receiving signals in the FBMC transmission system. FIG. 5 illustrates an example of an operation of filtering in a time domain.

Referring to FIG. 5, the transmitting apparatus 110 includes an IFFT 512, a transmission filter bank 514, and an overlapping and addition circuit 516. The IFFT 512 may perform an IFFT operation with respect to data symbols. The length of data symbols which has undergone the IFFT operation is equal to M. The transmission filter bank 514 may filter the result outputted from the IFFT 512 in the time domain. The transmission filter bank 514 may generate the same output as the IFFT 414 of FIG. 4. The operation of the transmission filter bank 412 of FIG. 4 corresponds to a convolution operation in the frequency domain, and a corresponding operation in the time domain may be implemented by signal repetition and filtering. More specifically, the transmission filter bank 514 may duplicate the result value outputted from the IFFT 512 as many as a filter order, and may perform multiplication with the transmission filter of the time domain corresponding to the frequency domain filter of the transmission filter bank 412 of FIG. 4.

The overlapping and addition circuit 516 may partially overlap and add the FBMC symbols which are generated by the multiplication. The FBMC symbols may not be transmitted independently from one another in the time domain, and may be transmitted, partially overlapping one another. More specifically, the rear end of the first FBMC symbol and the front end of the second FBMC symbol may overlap each other. That is, the overlapping and addition circuit 516 may arrange the FBMC symbols at predetermined intervals, and generate a transmission signal by adding the samples of the FBMC symbols located in the same time zone.

Although not shown in FIG. 5, the transmitting apparatus 110 may further include at least one circuit to transmit the transmission signal generated by the overlapping and addition circuit 516. The transmission signal generated by the overlapping and addition circuit 516 is a digital baseband signal. Accordingly, the transmitting apparatus 110 may further include at least one circuit to convert the transmission signal into an analogue signal and up-convert the analogue signal into a signal of an RF band.

The transmission signal may be transmitted to the antenna of the receiving apparatus 120. A reception filter bank 522 may perform time domain filtering using a reception filter corresponding to the transmission filter used in the transmission filter bank 514. In this case, the reception filter bank 522 may extract as many samples as the length of a single FBMC symbol from the reception signal which has been generated by overlapping and adding the FBMC symbols, and may perform reception filtering. In addition, the reception filter bank 522 may divide the signal according to a repetition order, and add the divided signals. Accordingly, the signal is restored to the signal before transmission filtering (for example, IFFT {D}). An FFT 522 may perform an FFT operation with respect to the signal provided from the reception filter bank 522. Accordingly, the data symbols D1 to Dm may be restored.

Figure 6:
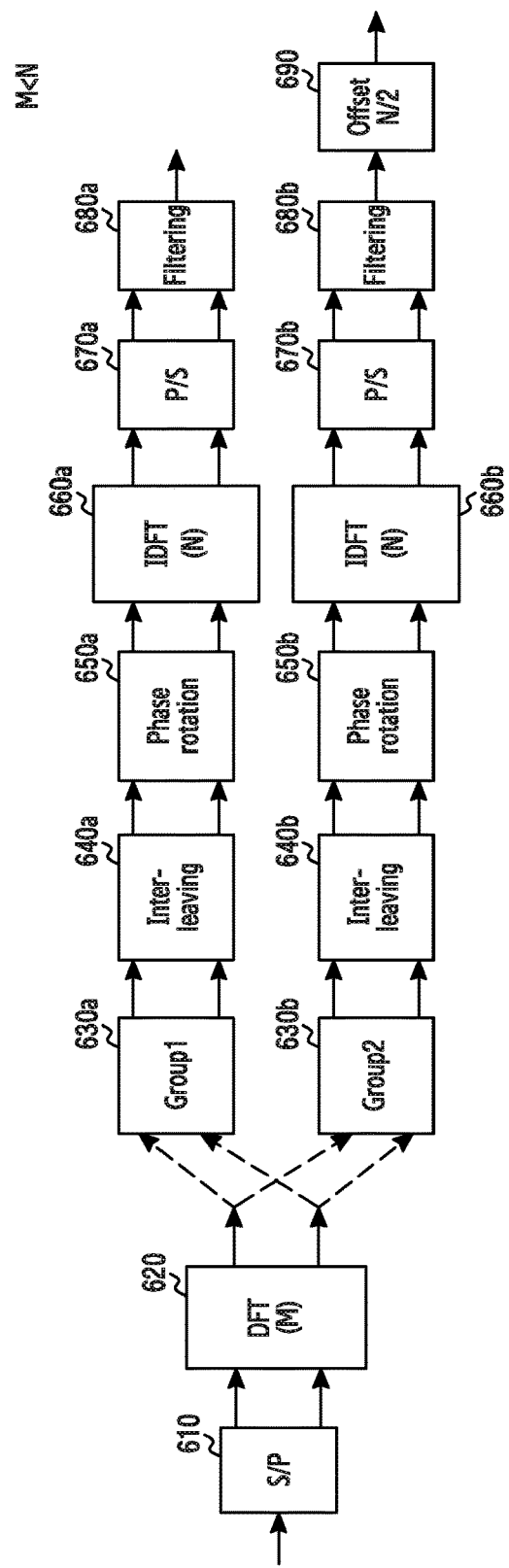
FIG. 6 illustrates a transmission signal processing according to exemplary embodiments.

FIG. 6 illustrates a transmission signal processing in the wireless communication system according to exemplary embodiments. FIG. 6 illustrates a process of FBMC modulating symbols which are modulated by the OQAM method in the transmitting apparatus 110.

Referring to FIG. 6, M refers to a data length. In addition, M may refer to the number of complex data symbols. N refers to an IDFT size in relation to whole carriers. That is, the transmitting apparatus 110 may transmit M complex data symbols using N carriers.

In block 610, the transmitting apparatus 110 may convert the M complex symbols which are modulated by OQAM from a series arrangement to a parallel arrangement. In block 620, the transmitting apparatus 110 may perform a DFT operation with respect to each of the converted symbols. When the DFT operation is performed, an offset interference may occur while the plurality of symbols undergoes an IFFT operation and is overlapped and added. The plurality of symbols may cause a low PAPR due to the offset interference. It may be noted that the transmitting apparatus 110 may perform the DFT operation before the plurality of symbols are divided into two groups. While the complex symbols are divided into two groups, the symbols included in each of the groups are divided in a single dimension (for example, into a real number part and an imaginary number part). However, when the transmitting apparatus 110 performs the DFT operation with respect to each of the symbols included in the two divided groups, the symbols are outputted in a complex dimension again and thus a mutual interference may occur. Accordingly, the DFT operation may be performed before the plurality of symbols are divided into two groups.

The transmitting apparatus 110 may divide the complex symbols which have undergone the DFT operation into a first group 630a including the real number part of the complex symbols and a second group 630b including the imaginary number part of the complex symbols. Even when the number of symbols included in the two divided groups increase by oversampling and then the symbols are overlapped and added, the influence of the interference may be reduced. That is, a PAPR may be reduced by overlapping and addition.

There is still a correlation between the two divided groups. Since the symbols included in the two divided groups that interfere each other while the symbols are overlapped and added, the PAPR may be still on the increase. Accordingly, according to an exemplary embodiment of the present disclosure, the transmitting apparatus 110 may perform interleaving and phase rotation with respect to each of the first group and the second group in blocks 640a and 640b and blocks 650a, and 650b. The interleaving and the phase rotation may cause an offset interference between two symbols when the symbols included in the two divided groups are added. The added symbols may reduce the PAPR due to the offset interference. The interleaving operation will be described in detail with reference to FIG. 16.

The transmitting apparatus 110 may generate FBMC symbols corresponding to the first group and the second group which have undergone the interleaving and the phase rotation. The FBMC modulation may correspond to the processing process which is performed by the transmitting apparatus 110 in FIG. 5. For example, referring to FIG. 6, the FBMC modulation may include blocks 660a and 660b to perform an IDFT operation, blocks 670a and 670b to perform parallel-to-serial (P/S) conversion, and blocks 680a and 680b to perform filtering. In FIG. 6, blocks 660a and 660b may perform the same or similar function as or to the IFFT 512 of FIG. 5. In addition, blocks 680a and 680b of FIG. 6 may perform the same or similar function as or to the transmission filter bank 514 of FIG. 5. When the second group 630b is filtered, the transmitting apparatus 110 may perform offsetting by M/2 in block 690. The offsetting is applied to synchronize at least two groups which are not synchronized in the time domain. For example, the first group including the real number part and the second group including the imaginary number part are transmitted at an interval of time of M/2 not to overlap each other.

Although not shown in FIG. 6, the transmitting apparatus 110 may overlap and add the symbols included in the two groups when the filtering is performed. The overlapping and adding is the same as or similar to the process which is performed in the overlapping and addition circuit 516 of FIG. 5. However, unlike in the overlapping and adding process shown in FIG. 5, the symbols processed by the interleaving and the phase rotation in FIG. 6 may cause a lower PAPR due to the offset interference.

According to an exemplary embodiment of FIG. 6, the operation of applying the DFT spreading technique in the transmitting apparatus 110 of the FBMC transmission system may be expressed in the form of a matrix as follows:

$$s = F V_M^{-1} W L V_N x_r = T x_r \qquad (1)$$

Equation 1 indicates a process of generating a signal in which two FBMC symbols overlap each other with respect to M complex data symbols. Herein, s indicates a signal which is modulated in the time domain. F indicates a matrix form of filtering. $V_M^{-1}$ indicates a matrix of IDFT having a size of M. W indicates a phase rotation matrix. L indicates an interleaving matrix. $V_N$ indicates a DFT matrix having a size of N. $x_r$ indicates a matrix of symbols having real values in the frequency domain.

According to an exemplary embodiment of the present disclosure, the phase rotation may perform multiplication by $$e^{j\frac{\pi}{2}(n+m \bmod 2)}.$$

Herein, n refers to a symbol block index and m refers to a carrier index. In addition, n+m mod 2 refers to a remainder after the sum of n and m is divided by 2.

Figure 7:
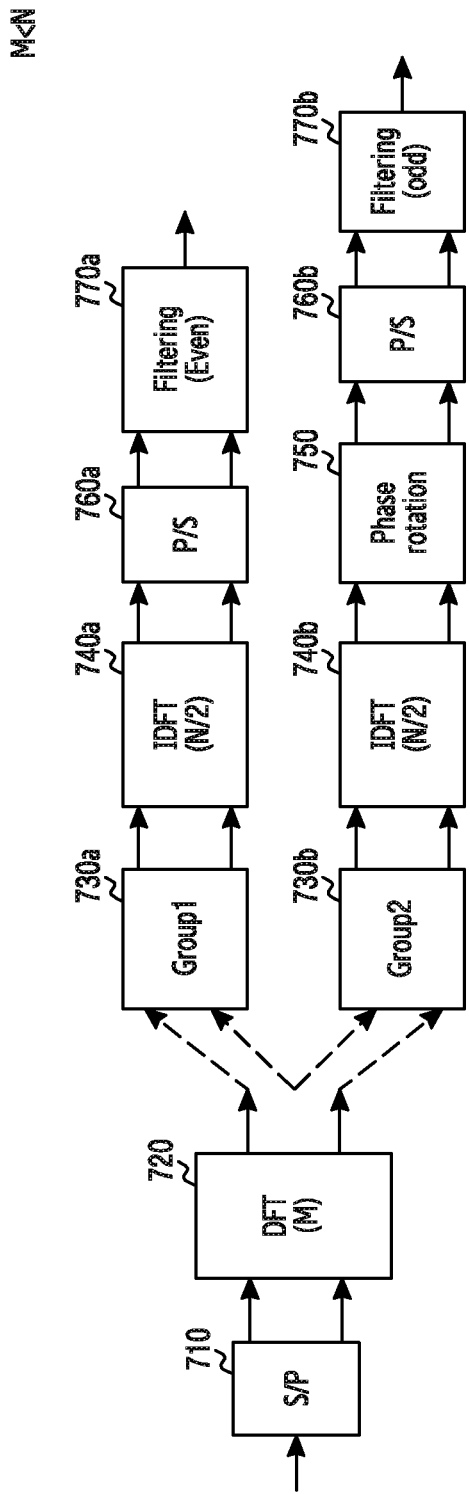
FIG. 7 illustrates another transmission signal processing according to exemplary embodiments.

FIG. 7 illustrates a transmission signal processing process in the wireless communication system according to exemplary embodiments. FIG. 7 illustrates a process of FBMC modulating symbols which are modulated by the QAM method in the transmitting apparatus 110.

Referring to FIG. 7, M refers to a data length. In addition, M may refer to the number of complex data symbols. N refers to an IDFT size in relation to whole carriers. That is, the transmitting apparatus 110 may transmit M complex data symbols using N carriers.

In block 710, the transmitting apparatus 110 may convert the M complex symbols which are modulated by QAM from a series arrangement to a parallel arrangement. In block 720, the transmitting apparatus 110 may perform a DFT operation with respect to each of the converted symbols. When the DFT operation is performed, an offset interference may occur even when the plurality of symbols are overlapped and added after the IFFT operation is performed. The plurality of symbols may cause a low PAPR due to the offset interference. It may be noted that the transmitting apparatus 110 may perform the DFT operation before the plurality of symbols is divided into two groups because there occurs a correlation between a first group 730a and a second group 730b when the plurality of symbols is divided into the two groups after the DFT operation is performed.

The transmitting apparatus 110 may divide the complex symbols which have undergone the DFT operation into the first group 730a and the second group 730b including the same number of symbols. For example, the first group 730a may include symbols having an odd number index from among the M symbols which have undergone the DFT operation, and the second group 730b may include symbols having an even number index. While the number of symbols increases by oversampling and then the symbols are overlapped and added, the overlapped and added symbols may reduce the influence of the interference. That is, a PAPR may be reduced by overlapping and addition.

The transmitting apparatus 110 may generate FBMC symbols corresponding to the first group and the second group. The FBMC modulation may correspond to the processing process which is performed by the communication interface 210 in FIG. 5. For example, referring to FIG. 7, the FBMC modulation may include blocks 740a and 740b to perform an IDFT operation, blocks 760a and 760b to perform parallel-to-serial (P/S) conversion, and blocks 770a and 770b to perform filtering. In FIG. 7, blocks 730a and 730b may perform the same or similar function as or to the IFFT 512 of FIG. 5. In addition, blocks 770a and 770b of FIG. 7 may perform the same or similar function as or to the transmission filter bank 514 of FIG. 5. In block 750, the transmitting apparatus 110 may perform phase rotation with respect to the symbols included in the second group 730b. The phase rotation may cause the offset interference while the symbols included in the two groups are overlapped and added.

Although not shown in FIG. 7, the transmitting apparatus 110 may overlap and add the symbols included in the first group and the second group when the filtering is performed. The overlapping and adding is the same as or similar to the process which is performed in the overlapping and addition circuit 516 of FIG. 5. However, unlike in the overlapping and adding process shown in FIG. 5, the symbols processed in FIG. 7 may cause the offset interference and thus may generate a lower PAPR.

According to an exemplary embodiment of FIG. 7, the operation of applying the DFT spreading technique in the transmitting apparatus 110 of the FBMC transmission system may be expressed in the form of a matrix as follows:

$$s = F W V_{M/2}^{-1} V_N x = T x \qquad (2)$$

Equation 2 indicates a process of generating a signal in which an even numbered symbol and an odd numbered symbol, that is, two FBMC symbols overlap each other with respect to M complex data symbols.

Herein, s indicates a signal which is modulated in the time domain. F indicates a matrix form of filtering. W indicates a phase rotation matrix. $V_{M/2}^{-1}$ indicates a matrix of IDFT having a size of M/2. $V_N$ indicates a DFT matrix having a size of N. x indicates a matrix of symbols having complex values in the frequency domain.

According to an exemplary embodiment of the present disclosure, the phase rotation may perform multiplication by $$x(n)e^{j\pi(\lfloor \frac{n}{M/2} \rfloor)}.$$

Herein, n refers to a sample index in the time domain and x(n) refers to an output value of an odd sub-carrier IDFT.

Figure 8:
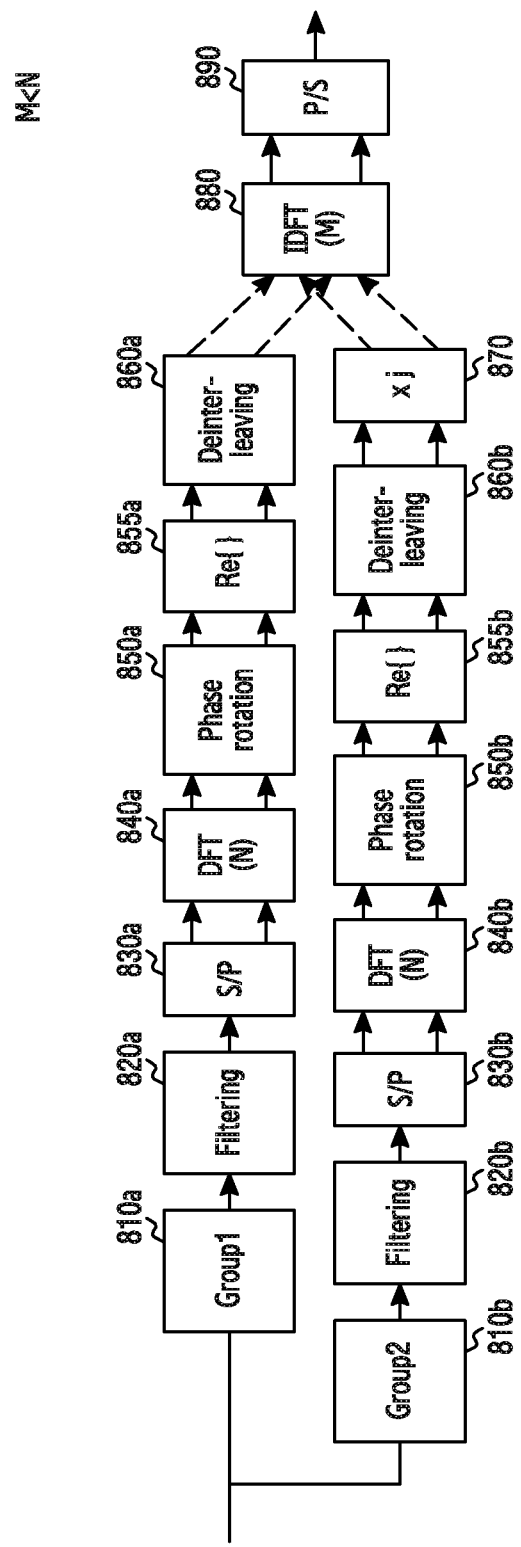
FIG. 8 illustrates a reception signal processing according to exemplary embodiments.

FIG. 8 illustrates a reception signal processing process in the wireless communication system according to exemplary embodiments. FIG. 8 illustrates a process of FBMC demodulating received symbols in the receiving apparatus 120. The received symbols include symbols which are modulated in the transmitting apparatus 110 by the OQAM method. A series of operations illustrated in FIG. 8 are symmetrical to the series of operations performed in the transmitting apparatus 110 of FIG. 6.

Referring to FIG. 8, M refers to a data length. In addition, M may refer to the number of complex data symbols. N refers to an IDFT size in relation to whole carriers. That is, the receiving apparatus 120 may receive N carriers and restore M complex data symbols.

In blocks 810a and 810b, the receiving apparatus 120 may divide the N received data symbols into a first group and a second group. The two divided groups may include the data symbols corresponding to the first group and the second group which are divided in FIG. 6. In blocks 820a and 820b, the receiving apparatus 120 performs multiplication by a filter coefficient with respect to each of the first group and the second group. In blocks 830a and 830b, the receiving apparatus 120 may convert each of the first group and the second group which have undergone the multiplication from a series arrangement to a parallel arrangement. In blocks 840a and 840b, the receiving apparatus 120 may perform a DFT operation of an N size with respect to each of the converted first group and second group. The DFT operation performed in blocks 840a and 840b of FIG. 8 is symmetrical to the IFFT operation which is performed in blocks 660a and 660b of FIG. 6. In blocks 850a and 850b, the receiving apparatus 120 performs phase rotation with respect to each of the first group and the second group which have undergone the DFT operation. A plurality of symbols included in the two groups which have undergone the phase rotation correspond to real values as shown in blocks 855a and 855b. That is, each of the blocks 855a and 855b indicates real values corresponding to the plurality of symbols included in the two groups. In blocks 860a and 860b, the receiving apparatus 120 deinterleaves each of the two groups which have undergone the phase rotation. When the deinterleaving is completed, the receiving apparatus 120 performs multiplication by a j value with respect to the group corresponding to the imaginary number part in the transmitting apparatus 110 (block 870). For example, it is assumed that the symbols of the second group generated in block 630b correspond to the real number. The symbols of the second group generated in block 810b of FIG. 8 correspond to the symbols of the second group generated in block 630b of FIG. 6. Accordingly, the receiving apparatus 120 performs the multiplication by the j value with respect to the symbols of the second group generated in block 810b of FIG. 8. When the multiplication is performed in block 870, the first group and the second group may include data symbol values corresponding to the real number part and the imaginary number part, respectively. In block 880, the receiving apparatus 120 performs an IDFT operation of an M size with respect to the two groups. The IDFT operation is symmetrical to the DFT operation performed in block 620 of FIG. 6. Similarly, it may be noted that the IDFT operation may be performed after the symbols included in the first group and the second group are added to make complex symbols. When the IDFT operation is performed, the receiving apparatus 120 converts the plurality of complex symbols from a parallel arrangement to a series arrangement in block 890.

Although not shown in FIG. 8, the receiving apparatus 120 may generate restored symbols by performing channel estimation and equalization with respect to the plurality of complex symbols which have been converted into the series arrangement in block 890.

Figure 9:
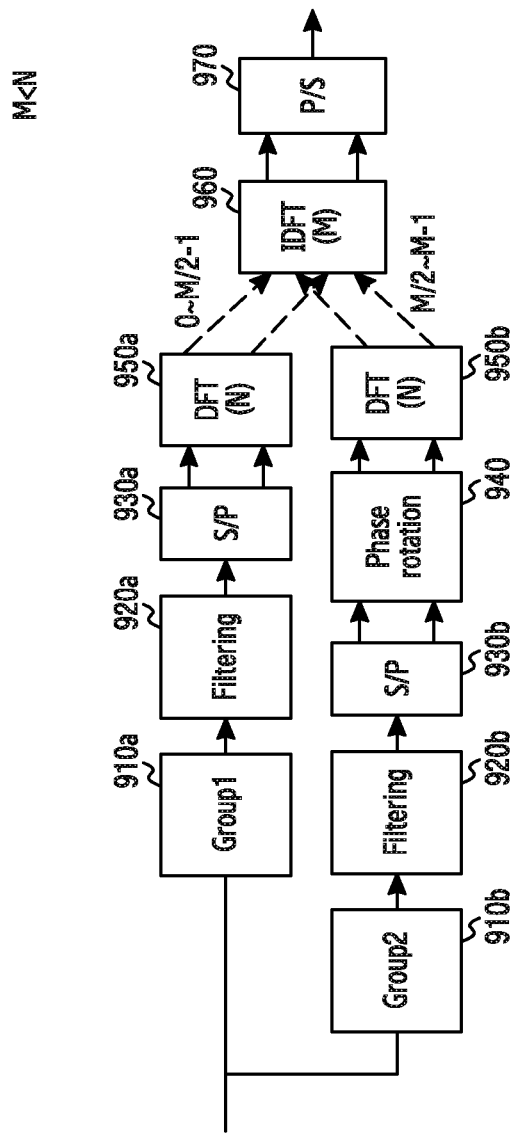
FIG. 9 illustrates another reception signal processing according to exemplary embodiments.

FIG. 9 illustrates a reception signal processing process in the wireless communication system according to exemplary embodiments. FIG. 9 illustrates a process of FBMC demodulating received symbols in the receiving apparatus 120. The received symbols include symbols which are modulated in the transmitting apparatus 110 by the QAM method. A series of operations illustrated in FIG. 9 are symmetrical to the series of operations performed in the transmitting apparatus 110 of FIG. 7.

Referring to FIG. 9, M refers to a data length. In addition, M may refer to the number of complex data symbols. N refers to an IDFT size in relation to whole carriers. That is, the receiving apparatus 120 may receive N carriers and restore M complex data symbols.

In blocks 910a and 910b, the receiving apparatus 120 may divide the N received data symbols into a first group and a second group. The two divided groups include the same number of symbols. In addition, neighbor symbols are divided into different groups. For example, the receiving apparatus 120 may divide the plurality of data symbols into symbols having an even number index and symbols having an odd number index. In blocks 920a and 920b, the receiving apparatus 120 may perform multiplication by a filter coefficient with respect to each of the first group and the second group. In blocks 930a and 930b, the receiving apparatus 120 converts each of the first group and the second group which have undergone the multiplication from a series arrangement to a parallel arrangement. In block 940, the receiving apparatus 120 performs phase rotation with respect to one of the converted first group and second group. For example, in block 940, the receiving apparatus 120 performs the phase rotation with respect to the second group including the symbols having the odd number index, whereas, in block 950a, the receiving apparatus 120 performs a DFT operation of an N/2 size with respect to the first group including the symbols having the even number index without performing the phase rotation. In blocks 950a and 950b, the receiving apparatus 120 performs the DFT operation of the N/2 size with respect to each of the first group and the second group. The reason why the DFT operation of the N/2 size is applied is that the N received data symbols are divided into groups including N/2 symbols in blocks 910a and 910b. The DFT operation performed in blocks 950a and 950b of FIG. 9 is symmetrical to the IFFT operation performed in blocks 740a and 740b of FIG. 7. In block 960, the receiving apparatus 120 performs an IDFT operation of an M size with respect to the first group and the second group which have undergone the DFT operation. The IDFT operation is symmetrical to the DFT operation performed in block 720 of FIG. 7. Similarly, it may be noted that the IDFT operation may be performed after the first group and the second group each including N/2 symbols are added. In block 970, the receiving apparatus 120 converts the M data symbols which have undergone the IDFT operation from a parallel arrangement to a series arrangement.

Although not shown in FIG. 9, the receiving apparatus 120 may generate restored symbols by performing channel estimation and equalization with respect to the plurality of symbols which have been converted into the series arrangement.

Figure 10:
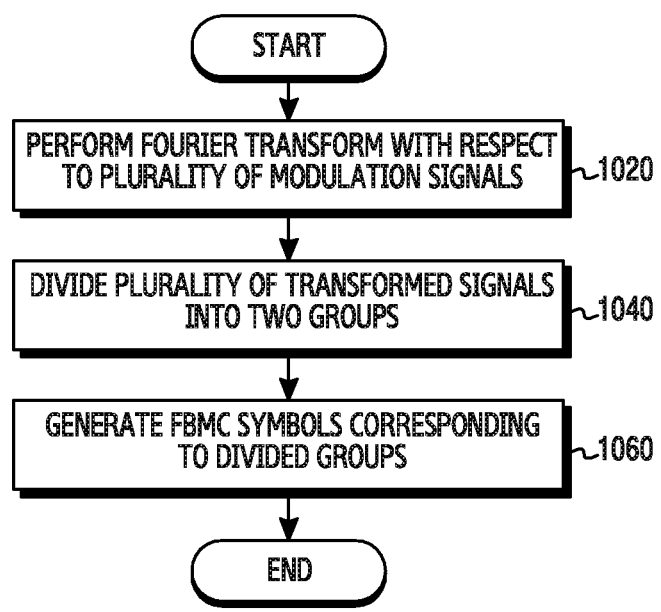
FIG. 10 illustrates a flowchart of a transmission signal processing according to an exemplary embodiment.

FIG. 10 illustrates a flowchart of a transmission signal processing in the wireless communication system according to exemplary embodiments. FIG. 10 illustrates the transmission signal processing process in the transmitting apparatus 110.

Referring to FIG. 10, in step 1020, the transmitting apparatus 110 performs Fourier transform with respect to a plurality of modulation symbols. When the Fourier transform is performed, a probability that a random signal is generated while IFFT is performed is reduced. Therefore, a PAPR may further be reduced while overlapping and addition are performed. In step 1040, the transmitting apparatus 110 may divide the symbols which have undergone the Fourier transform into two groups. For example, the transmitting apparatus 110 may divide the symbols which are OQAM modulated into a real number part and an imaginary number part. In another example, the transmitting apparatus 110 may divide the symbols which are QAM modulated into symbols corresponding to an even number index and symbols corresponding to an odd number index. In step 1060, the transmitting apparatus 110 generates FBMC modulation symbols corresponding to the two divided groups. For example, the FBMC modulation may include an IFFT operation, a filtering process, and an overlapping and adding process. In another example, the FBMC modulation may perform the IFFT operation after performing the filtering.

Figure 11:
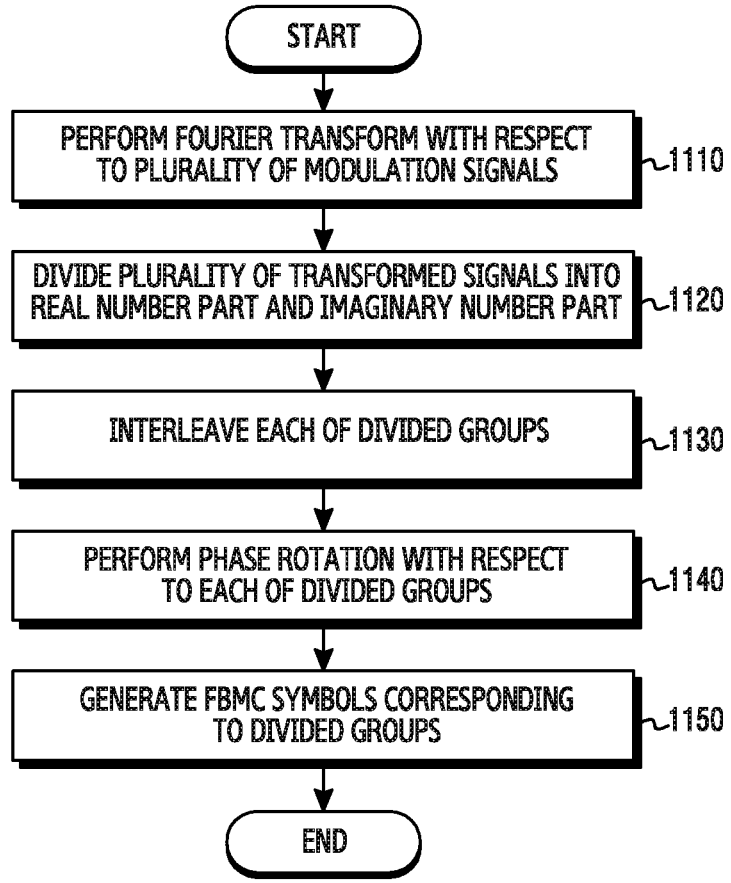
FIG. 11 illustrates another flowchart of a transmission signal processing according to exemplary embodiments.

FIG. 11 illustrates another flowchart of a transmission signal processing in the wireless communication system according to exemplary embodiments. FIG. 11 illustrates the transmission signal processing process in the transmitting apparatus 110. In addition, FIG. 11 illustrates a flowchart of an operation of applying a DFT spreading technique to symbols which are modulated by the OQAM method.

Referring to FIG. 11, in step 1110, the transmitting apparatus 110 performs Fourier transform with respect to a plurality of modulation symbols. When the Fourier transform is performed, a probability that a random signal is generated while IFFT is performed is reduced. Therefore, a PAPR may further be reduced while overlapping and addition are performed. In step 1120, the transmitting apparatus 110 may divide the symbols which have undergone the Fourier transform into a real number part and an imaginary number part. In step 1130, the transmitting apparatus 110 interleaves each of the symbols included in the divided groups. In step 1140, the transmitting apparatus 110 performs phase rotation with respect to each of the symbols included in the divided groups. In step 1150, the transmitting apparatus 110 generates FBMC symbols corresponding to the divided groups. For example, the FBMC modulation may include an IFFT operation, a filtering process, and an overlapping and adding process. In another example, the FBMC modulation may perform the IFFT operation after performing the filtering.

Figure 12:
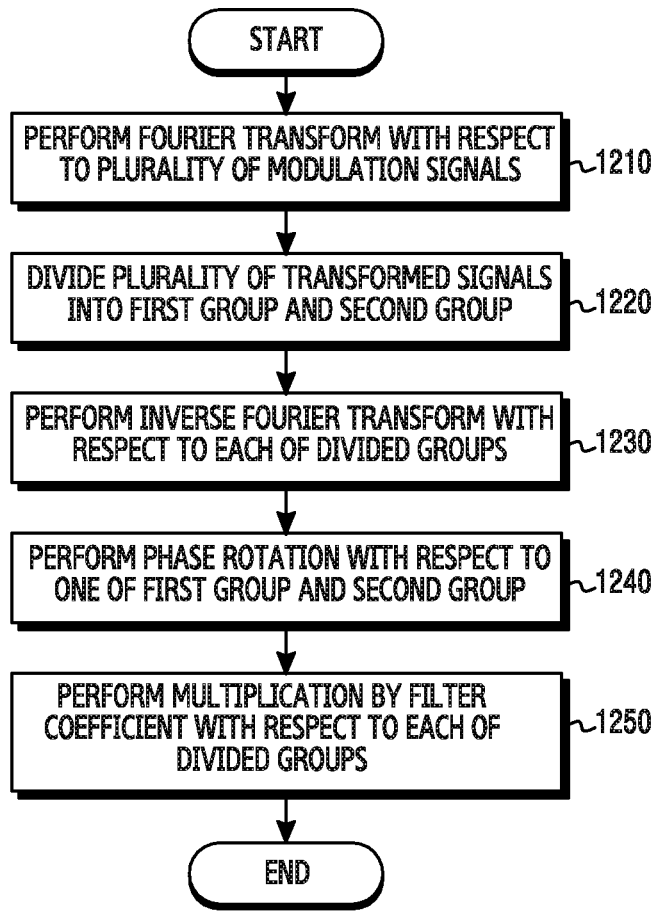
FIG. 12 illustrates yet another flowchart of a transmission signal processing according to exemplary embodiments.

FIG. 12 illustrates yet another flowchart of a transmission signal processing in the wireless communication system according to exemplary embodiments. FIG. 12 illustrates the transmission signal processing process in the transmitting apparatus 110. In addition, FIG. 12 illustrates a flowchart of an operation of applying a DFT spreading technique to symbols which are modulated by the QAM method.

Referring to FIG. 12, in step 1210, the transmitting apparatus 110 performs Fourier transform with respect to a plurality of modulation symbols. When the Fourier transform is performed, a probability that a random signal is generated while IFFT is performed is reduced. Therefore, a PAPR may further be reduced while overlapping and addition are performed. In step 1220, the transmitting apparatus 110 may divide the symbols which have undergone the Fourier transform into two groups. For example, the transmitting apparatus 110 may divide the plurality of symbols into symbols corresponding to an odd number index and symbols corresponding to an even number index. In step 1230, the transmitting apparatus 110 may perform inverse Fourier transform with respect to the symbols included in each of the divided groups. When the inverse Fourier transform is performed, the symbols in the frequency domain may be transformed into the symbols in the time domain. In step 1240, the transmitting apparatus 110 may perform phase rotation with respect to symbols included in one of the two divided groups. For example, the transmitting apparatus 110 may perform phase rotation with respect to the first group including the symbols corresponding to the odd number index. In step 1250, the transmitting apparatus 110 may perform multiplication by a filter coefficient with respect to each of the symbols included in the two divided groups.

Figure 13:
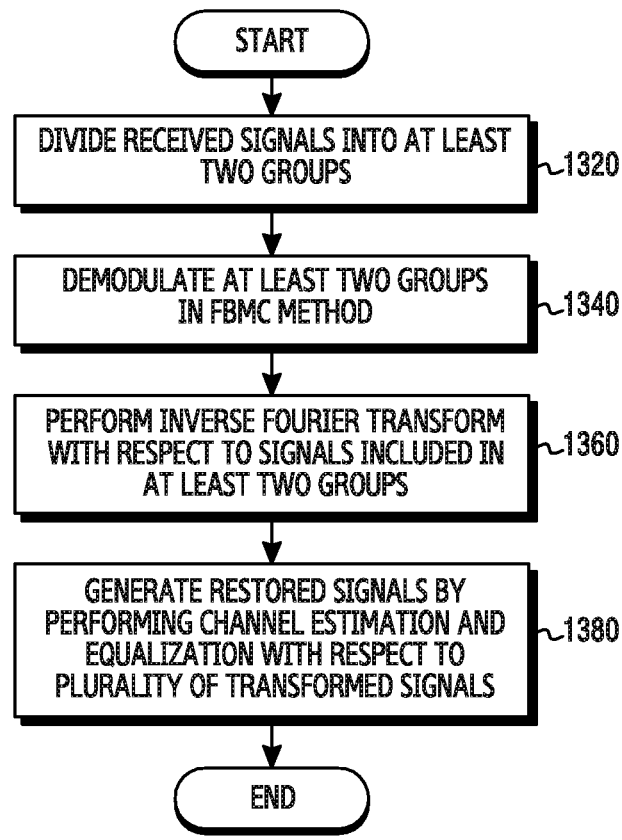
FIG. 13 illustrates a flowchart of a reception signal processing according to exemplary embodiments.

FIG. 13 illustrates a flowchart of a reception signal processing process in the wireless communication system according to exemplary embodiments. FIG. 13 illustrates the reception signal processing process in the receiving apparatus 120.

Referring to FIG. 13, in step 1320, the receiving apparatus 120 divides received symbols into at least two groups. For example, the receiving apparatus 120 may divide the symbols which have been OQAM modulated in the transmitting apparatus into a real number part and an imaginary number part. In another example, the receiving apparatus 120 may divide the symbols which have been QAM modulated in the transmitting apparatus into symbols corresponding to an even number index and symbols corresponding to an odd number index. In step 1340, the receiving apparatus 120 demodulates each of the at least two divided groups in the FBMC method. In step 1360, the receiving apparatus 120 may perform inverse Fourier transform with respect to the plurality of symbols included in the at least two demodulated groups. The inverse Fourier transform is performed by a single inverse Fourier transform operation. In step 1380, the receiving apparatus 120 generates a plurality of restored symbols by performing channel estimation and equalization with respect to the plurality of symbols which have undergone the inverse Fourier transform. For example, the restored symbols may correspond to the symbols which are modulated in the transmitting apparatus by the OQAM method. In another example, the modulation symbols may correspond to the symbols which are modulated in the QAM method.

Figure 14:
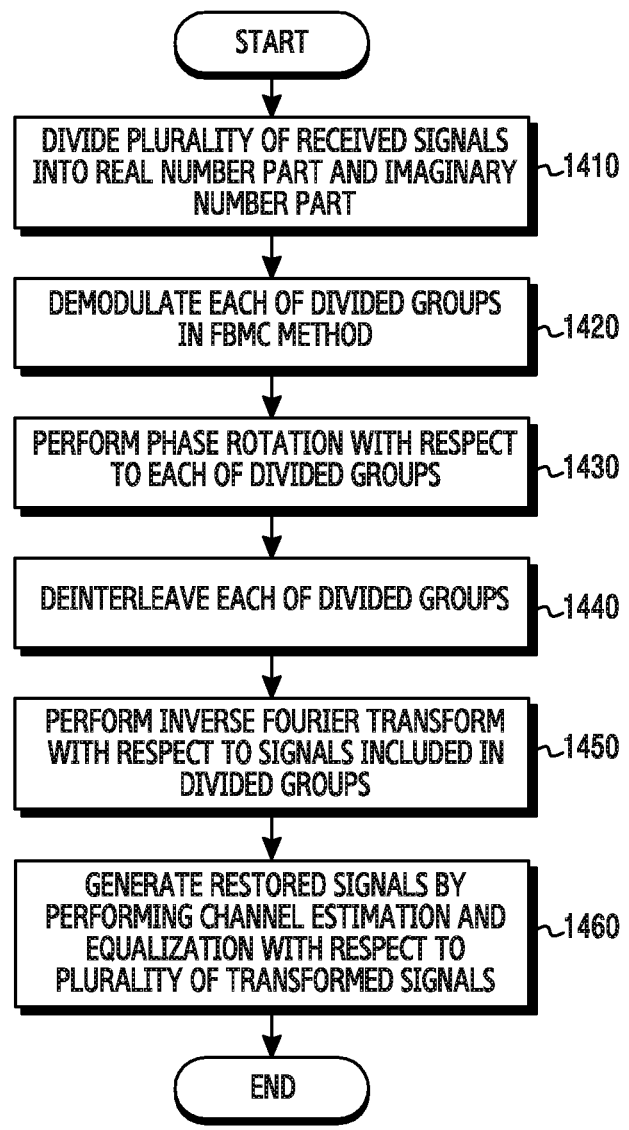
FIG. 14 illustrates a another flowchart of a reception signal processing according to exemplary embodiments.

FIG. 14 illustrates another flowchart of a reception signal processing process in the wireless communication system according to exemplary embodiments. FIG. 14 illustrates the reception signal processing process in the receiving apparatus 120. In addition, FIG. 14 illustrates a flowchart of an operation of applying a DFT spreading technique to symbols which are modulated in the OQAM method.

In step 1410, the receiving apparatus 120 divides a plurality of received symbols into two groups corresponding to a real number part and an imaginary number part. In step 1420, the receiving apparatus 120 demodulates each of the two divided groups in the FBMC method. In step 1430, the receiving apparatus 120 may perform phase rotation with respect to each of the two divided groups. In step 1440, the receiving apparatus 120 deinterleaves each of the two divided groups. In step 1450, the receiving apparatus 120 may perform inverse Fourier transform with respect to the plurality of symbols included in the two divided groups. The inverse Fourier transform is performed by a single inverse Fourier transform operation. In step 1460, the receiving apparatus 120 generates a plurality of restored symbols by performing channel estimation and equalization with respect to the plurality of transformed symbols.

Figure 15:
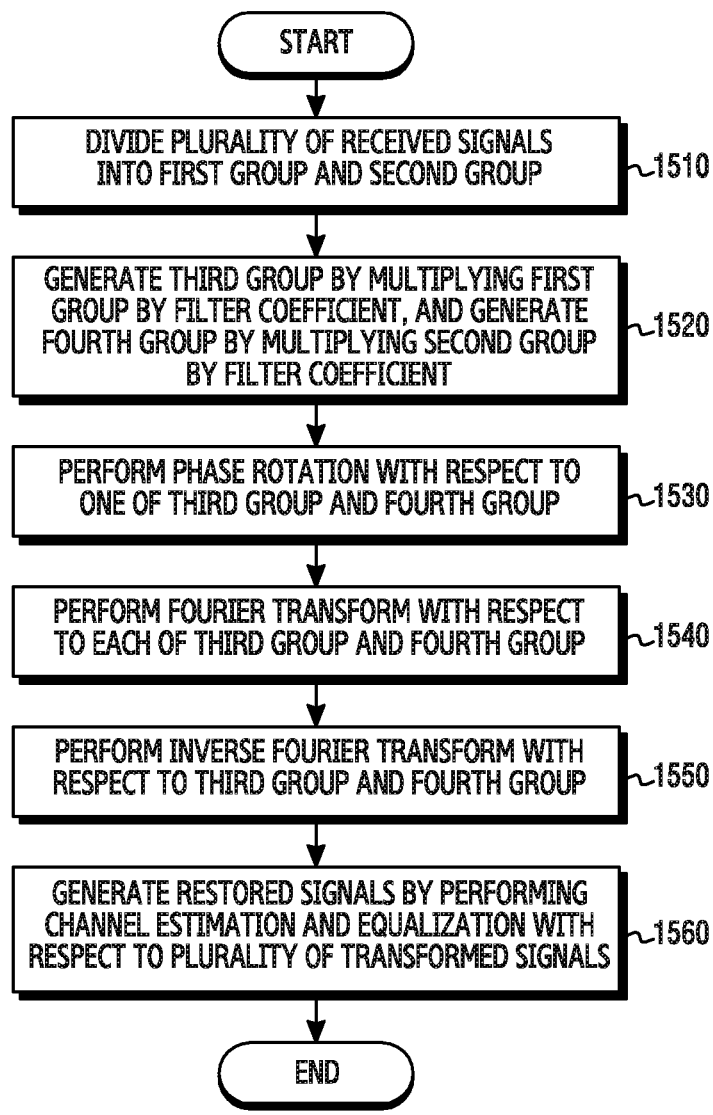
FIG. 15 illustrates yet another flowchart of a reception signal processing according to exemplary embodiments.

FIG. 15 illustrates yet another flowchart of a reception signal processing in the wireless communication system according to exemplary embodiments. FIG. 15 illustrates the reception signal processing process in the receiving apparatus 120. In addition, FIG. 15 illustrates a flowchart of an operation of applying a DFT spreading technique to symbols which are modulated by the QAM method.

Referring to FIG. 15, in step 1510, the receiving apparatus 120 divides a plurality of received symbols into a first group and a second group. The first group and the second group include the same number of symbols. For example, when the number of received symbols is M, each of the first group and the second group includes M/2 symbols. In step 1520, the receiving apparatus 120 generates a third group by multiplying the first group by a filter coefficient, and generates a fourth group by multiplying the second group by a filter coefficient. The filter coefficient by which the first group is multiplied and the filter coefficient by which the second group is multiplied have the same factor. That is, the third group and the fourth group include the same number of symbols. In step 1530, the receiving apparatus 120 performs phase rotation with respect to one of the third group and the fourth group. In step 1540, the receiving apparatus 120 performs Fourier transform with respect to each of the third group and the fourth group. In step 1550, the receiving apparatus 120 may perform inverse Fourier transform with respect to the plurality of symbols included in the third group and the fourth group. The inverse Fourier transform is performed by a single inverse Fourier transform operation. In step 1560, the receiving apparatus 120 generates a plurality of restored signals by performing channel estimation and equalization with respect to the plurality of transformed symbols. For example, the plurality of restored signals may correspond to signals which are modulated in the QAM method.

Figure 16:
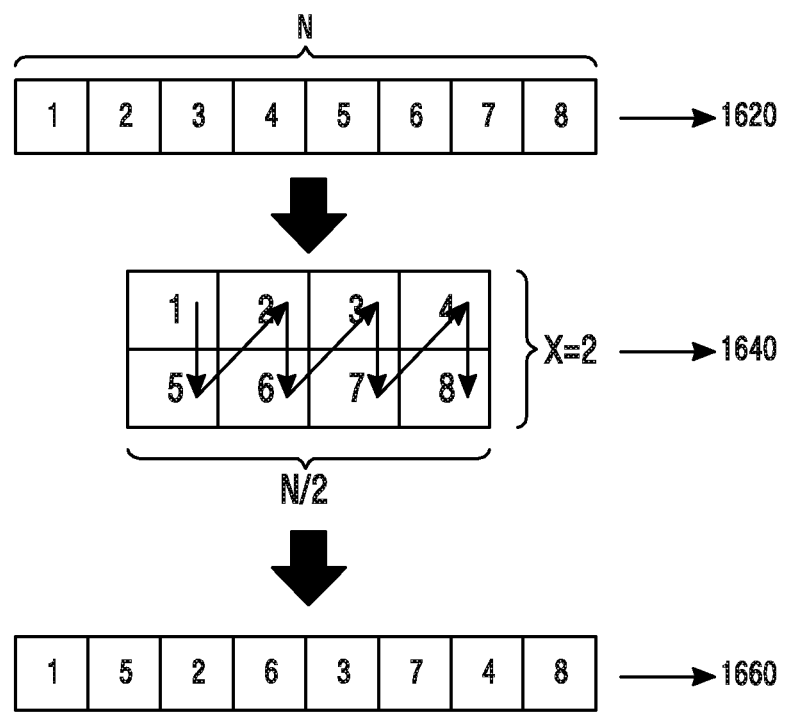
FIG. 16 illustrates an interleaving operation according to exemplary embodiments.

FIG. 16 illustrates an interleaving operation in the wireless communication system according to exemplary embodiments.

Referring to FIG. 16, the length of data symbols may be N and the number of blocks to interleave may be X. For example, FIG. 16 illustrates that the length of data symbols N=8 and the number of blocks X=2. The N value and the X value are defined as described above for the convenience of explanation, but other values may be substituted for the N value and the X value.

In step 1620, eight (8) data symbols have indexes 1 to 8. The data symbols are arranged according to a predetermined order of the indexes. For example, the symbols having the indexes 1-8 may correspond to 1, j, −1, −j, 1, j, 1, j.

In step 1640, the data symbols may be rearranged in two block lines. For example, as shown in FIG. 16, symbols having indexes 1 to 4 from among the data symbols may form one line and symbols having indexes 5 to 8 may form the other line. That is, four (4) data symbols are arranged in one line.

In step 1660, the data symbols rearranged as described above may be rearranged in a single line according to a predetermined regulation. For example, the data symbols may be rearranged in an order as illustrated in the lower drawing. In this case, the symbol having index 5 is arranged next to the symbol having index 1. Next, when the symbol having index 2 is arranged, the symbol having index 6 is arranged thereafter.

Since an inter-signal offset interference occurs while the data symbols are overlapped and added by the above-described block interleaving operation, a low PAPR may be caused.

Figure 17:
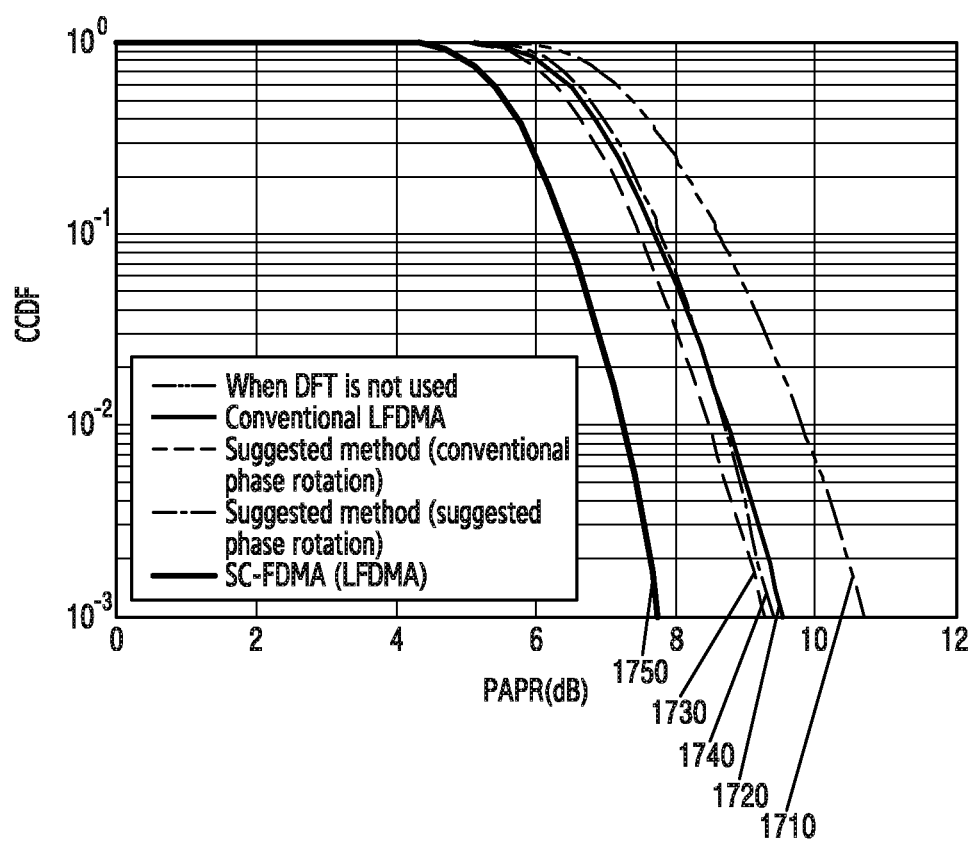
FIG. 17 illustrates a peak to average power ration (PAPR) performance according to exemplary embodiments.

FIG. 17 illustrates a PAPR performance in the wireless communication system according to exemplary embodiments. In FIG. 17, a PAPR performance in the operation of applying the DFT spreading technique in the OQAM method and a PAPR performance in other methods are compared.

Referring to FIG. 17, the x-axis refers to a PAPR value. In addition, the y-axis refers to a complementary cumulative distribution function (CCDF) value. The CCDF means a probability that a random signal is generated with respect to the same PAPR value. For example, in FIG. 17, graph 1710 indicates that a probability that a random signal is generated while the PAPR value reaches about 8.5 dB is $1/10$. In another example, graph 1710 indicates that a probability that a random signal is generated while the PAPR value reaches about 9.5 dB is $1/100$.

Graph 1710 shows a PAPR performance when the DFT spreading technique is not applied in an existing FBMC transmission system. Graph 1720 shows a PAPR performance when only the DFT spreading technique is applied in the existing FBMC transmission system and interleaving and phase rotation are not applied. Graph 1730 shows a PAPR performance when the DFT spreading technique according to the above-described method is applied in the FBMC transmission system, but related-art phase rotation is applied. Graph 1740 shows a PAPR performance when the DFT spreading technique according to the above-described method is applied in the FBMC transmission system and phase rotation according to the above-described method is applied. Graph 1750 shows a PAPR performance when the DFT spreading technique is applied in the related-art OFDM method. For example, when the probability that the random signal is generated is $1/10$, graph 1710 shows that the PAPR value of about 8.5 dB is generated, whereas graph 1730 shows that the PAPR value of about 7.5 dB is generated.

Figure 18:
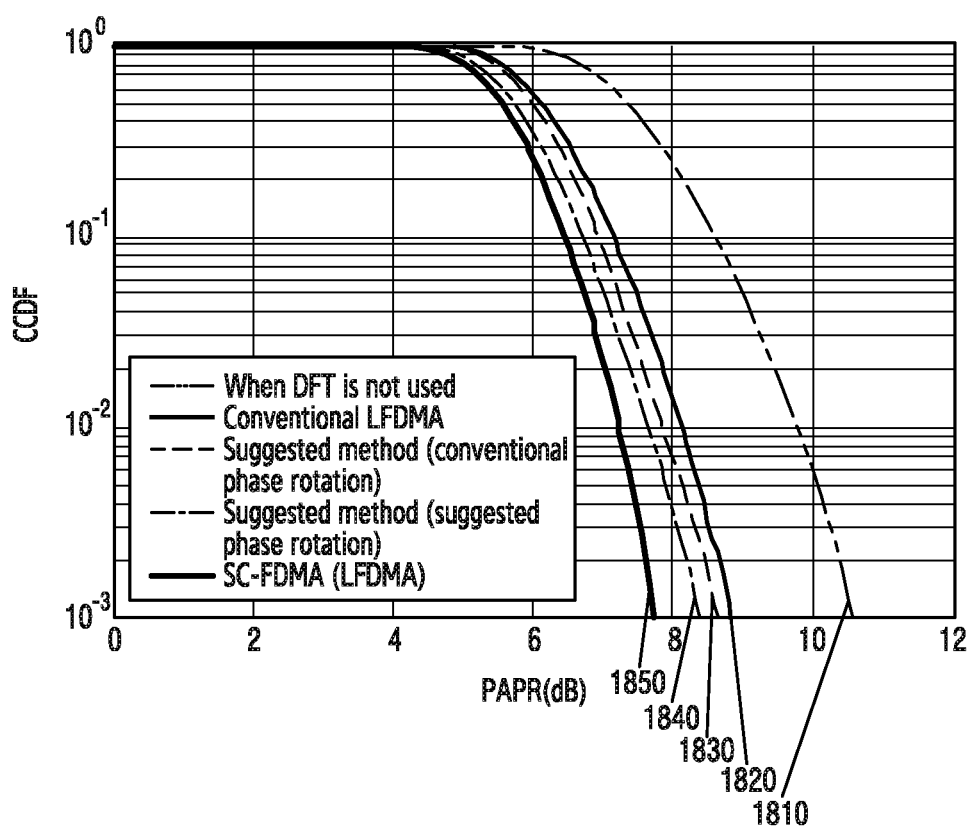
FIG. 18 illustrates another PAPR performance according to exemplary embodiments.

FIG. 18 illustrates another PAPR performance in the wireless communication system according to exemplary embodiments. In FIG. 18, a PAPR performance in the operation of applying the DFT spreading technique in the QAM method and a PAPR performance in other methods are compared.

Referring to FIG. 18, the x-axis refers to a PAPR value. In addition, the y-axis refers to a CCDF value. The CCDF means a probability that a random signal is generated with respect to the same PAPR value. For example, in FIG. 18, graph 1810 indicates that a probability that a random signal is generated while the PAPR value reaches about 8.5 dB is ¹/₁₀. In another example, graph 1810 indicates that a probability that a random signal is generated while the PAPR value reaches about 9.5 dB is ¹/₁₀₀.

Graph 1810 shows a PAPR performance when the DFT spreading technique is not applied in an existing FBMC transmission system. Graph 1820 shows a PAPR performance when only the DFT spreading technique is applied in the existing FBMC transmission system and interleaving and phase rotation are not applied. Graph 1830 shows a PAPR performance when the DFT spreading technique according to the above-described method is applied in the FBMC transmission system, but related-art phase rotation is applied. Graph 1840 shows a PAPR performance when the DFT spreading technique according to the above-described method is applied in the FBMC transmission system and phase rotation according to the above-described method is applied. Graph 1850 shows a PAPR performance when the DFT spreading technique is applied in the related-art OFDM method. For example, when the probability that the random signal is generated is ¹/₁₀, graph 1810 shows that the PAPR value of about 8.5 dB is generated, whereas graph 1840 shows that the PAPR value of about 7 dB is generated.

The methods according to exemplary embodiments described in the claims or descriptions of the present disclosure may be implemented by hardware, software, or a combination of hardware and software.

The software may be stored in a computer readable storage medium. The computer readable storage medium may store at least one program (software module) and at least one program including instructions for the electronic device to perform the method of the present disclosure when being executed by at least one processor in the electronic device.

The software may be stored in a volatile storage device or a non-volatile storage device such as a read only memory (ROM), a memory such as a Random Access Memory (RAM), a memory chip device, or an integrated circuit, or an optical or magnetic readable medium such as a compact disc-ROM (CD-ROM), digital versatile discs (DVDs), a magnetic disk, or a magnetic tape.

The storage device and the storage medium are exemplary embodiments of a machine readable storing means which is appropriate to store a program or programs including the instructions for implementing the embodiments when being executed. The exemplary embodiments provide a program including a code for implementing the apparatus or method as claimed in any one of the claims of the specification, and a machine readable storage medium for storing such a program. Furthermore, these programs may be electronically transmitted by a certain means such as a communication signal which is transmitted through wired or wireless connection, and the exemplary embodiments appropriately include the equivalents.

In the above-described exemplary embodiments, the elements included in the present disclosure are expressed in singular forms or plural forms according to a detailed exemplary embodiment. However, the singular or plural expression is appropriately selected according to a suggested situation for the convenience of explanation, and the above-described exemplary embodiments are not limited to the singular or plural elements. An element expressed in the plural form may be configured as a single element or an element expressed in the singular form may be configured as a plurality of elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a transmitting apparatus, the method comprising:
applying a Fourier transform to modulation symbols;
determining a first group of symbols and a second group of symbols in the modulation symbols to which the Fourier transform is applied;
applying, to at least one group among the first group and the second group, a pre-processing to reduce interference between the first group and the second group to be caused by combining the first group and the second group;
generating filter bank multicarrier (FBMC) symbols by the combining the first group and the second group comprising the at least one group to which the pre-processing is applied; and
transmitting the FBMC symbols.

2. The method of claim 1, wherein the modulation symbols are based on a offset quadrature amplitude modulation (OQAM), and
wherein the first group comprises a real part of the modulation symbols and the second group comprises an imaginary part of the modulation symbols.

3. The method of claim 2, wherein applying the pre-processing comprises applying an interleaving operation to each of the first group and the second group.

4. The method of claim 3, wherein applying the pre-processing further comprises:
applying a phase rotation to each of the first group and the second group, further comprising: and
applying an inverse Fourier transform to the first group and the second group to which the phase rotation is applied.

5. The method of claim 1, wherein the modulation symbols are based on a quadrature amplitude modulation (QAM), and
wherein the first group and the second group comprise a same number of symbols.

6. The method of claim 5, further comprising:
applying an inverse Fourier transform to the first group and the second group before the pre-processing is applied,
wherein applying the pre-processing further comprises applying a phase rotation to one of the first group and the second group to which the inverse Fourier transform is applied.

7. A transmitting apparatus comprising:
at least one processor configured to:
apply a Fourier transform to modulation symbols,
determine a first group of symbols and a second group of symbols in the modulation symbols to which the Fourier transform is applied,
apply, to at least one group among the first group and the second group, a pre-processing to reduce interference between the first group and the second group to be caused by combining the first group and the second group, and
generate filter bank multicarrier (FBMC) symbols by combining the first group and the second group comprising the at least one group to which the pre-processing is applied; and
at least one transceiver operably connected to the at least one processor, the at least one transceiver configured to transmit the FBMC symbols.

8. The transmitting apparatus of claim 7, wherein the modulation symbols are based on a offset quadrature amplitude modulation (OQAM), and
   wherein the first group comprises a real part of the modulation symbols and the second group comprises an imaginary part of the modulation symbols.

9. The transmitting apparatus of claim 8, wherein the at least one processor is further configured to apply an interleaving operation to each of the first group and the second group.

10. The transmitting apparatus of claim 9, wherein the at least one processor is further configured to:
   apply a phase rotation to each of the first group and the second group; and
   apply an inverse Fourier transform to the first group and the second group to which the phase rotation is applied.

11. The transmitting apparatus of claim 7, wherein the modulation symbols are based on a quadrature amplitude modulation (QAM), and
   wherein the first group and the second group comprise a same number of symbols.

12. The transmitting apparatus of claim 11, wherein the at least one processor is further configured to
   apply an inverse Fourier transform to the first group and the second group before the pre-processing is applied; and
   apply a phase rotation to one of the first group and the second group to which the inverse Fourier transform is applied.

13. A receiving apparatus comprising:
   at least one transceiver configured to receive, from a transmit apparatus, filter bank multicarrier (FBMC) symbols, wherein the FBMC symbols are generated by the transmit apparatus by:
   applying a Fourier transform to a modulation symbols;
   determining a first group of symbols and a second group of symbols in the modulation symbols to which the Fourier transform is applied;
   applying, to at least one group among the first group and the second group, a pre-processing to reduce interference between the first group and the second group to be caused by combining the first group and the second group; and
   generating the FBMC symbols by combining the first group and the second group comprising the at least one group to which the pre-processing is applied; and
   at least one processor operably connected to the at least one transceiver, the at least one processor configured to apply a processing corresponding to the pre-processing to the FBMC symbols.

14. The receiving apparatus of claim 13, wherein the modulation symbols are based on a offset quadrature amplitude modulation (OQAM), and
   wherein the first group comprises a real part of the modulation symbols and the second group comprises an imaginary part of the modulation symbols.

15. The receiving apparatus of claim 14, wherein the at least one processor is further configured to apply a phase rotation to each of the first group and the second group.

16. The receiving apparatus of claim 15, wherein the at least one processor is further configured to deinterleave each of the first group and the second group to which the phase rotation is applied.

17. The receiving apparatus of claim 13, wherein the modulation symbols are based on a quadrature amplitude modulation (QAM), and
   wherein the first group and the second group comprise a same number of symbols.

18. The receiving apparatus of claim 17, wherein the at least one processor is further configured to:
   generate a third group by multiplying the first group by a filter coefficient;
   generate a fourth group by multiplying the second group by the filter coefficient;
   apply a phase rotation to one of the third group and the fourth group; and
   apply Fourier transform to each of the third group and the fourth group.

* * * * *